United States Patent
Bagwell et al.

(10) Patent No.: US 9,710,437 B2
(45) Date of Patent: Jul. 18, 2017

(54) GROUP TAGGING OF DOCUMENTS

(71) Applicant: International Business Machines Corporation, Armonk, NY (US)

(72) Inventors: Derek P. Bagwell, Rochester, MN (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 14/327,901

(22) Filed: Jul. 10, 2014

(65) Prior Publication Data

US 2016/0012019 A1  Jan. 14, 2016

(51) Int. Cl.
*G06F 17/30* (2006.01)
*G06F 17/27* (2006.01)
*G06F 17/21* (2006.01)

(52) U.S. Cl.
CPC ........ *G06F 17/218* (2013.01); *G06F 17/2785* (2013.01); *G06F 17/30011* (2013.01); *G06F 17/30598* (2013.01); *G06F 17/30876* (2013.01)

(58) Field of Classification Search
CPC ............... G06F 17/218; G06F 17/2785; G06F 17/30011
See application file for complete search history.

(56) References Cited

U.S. PATENT DOCUMENTS

| | | | |
|---|---|---|---|
| 8,359,191 B2 | 1/2013 | Chen et al. | |
| 8,402,022 B2 | 3/2013 | Frank et al. | |
| 8,589,433 B2 | 11/2013 | Gawor et al. | |
| 8,769,037 B2* | 7/2014 | Bostick | G06F 17/30997 709/203 |
| 2008/0222142 A1* | 9/2008 | O'Donnell | G06F 17/30867 |
| 2013/0046761 A1* | 2/2013 | Soderberg | G06F 17/30038 707/736 |
| 2014/0066999 A1* | 3/2014 | Carcieri | G06F 19/3406 607/2 |
| 2015/0331929 A1* | 11/2015 | El-Saban | G06F 17/30598 707/739 |

OTHER PUBLICATIONS

Yuying Jiao, A Collaborative Tagging System for Personalized Recommendation in B2C Electronic Commerce, Oct. 8, 2007, IEEE Xplore, pp. 1-4.*

(Continued)

*Primary Examiner* — Kavita Padmanabhan
*Assistant Examiner* — Ahmad M El-Bkaily
(74) *Attorney, Agent, or Firm* — Yee & Associates, P.C.; Damion Josephs

(57) ABSTRACT

Assigning a new set of tags to a document is provided. A document with a set of existing tags created by an author of the document is received via a network. A set of new tags created by a group of tag editors corresponding to the document is received via the network. The set of existing tags created by the author of the document is processed with the set of new tags created by the group of tag editors. A new set of tags is assigned to the document based on processing the set of existing tags created by the author of the document with the set of new tags created by the group of tag editors.

11 Claims, 5 Drawing Sheets

(56) References Cited

OTHER PUBLICATIONS

Bernice E. Rogowitz, Tags, Micro-Tags and Tag Editting: Improving Internet Search, Feb. 10, 2009, SPIE Digital Library, Confrence vol. 7240, pp. 1-11.*

"System and Method to allow users to associate ratings or weights with tags in a tagging system," IP.com Prior Art Database Technical Disclosure No. IPCOM000171805D, Jun. 19, 2008, 4 pages.

Brajeshwar, "Use of crowd intelligence to tag your Posts—"TagThis" Plugin," Jan. 30, 2008, 2 pages Accessed Jul. 10, 2014, http://brajeshwar.com/2008/tagthis-wordpress-plugin/.

Garabedyan, "Context-powered (social wisdom of the crowd) tagging," Oct. 9, 2009, 2 pages. Accessed Jun. 30, 2014, http://garabedyan.wordpress.com/2009/10/09/context-powered-social-wisdom-of-the-crowd-tagging/.

Loxton et al., "Crowd-sourcing and tagging: an application of knowledge management to continuous process improvement and innovation," Sep. 17, 2010, 5 pages. Accessed Jun. 30, 2014, http://elisabethgoodman.wordpress.com/2010/09/17/crowd-sourcing-and-tagging-an-application-of-knowledge-management-to-continuous-process-improvement-and-innovation/.

Steinbock, "Tag Crowd," Jul. 2006, 1 page, accessed Jun. 30, 2014. http://tagcrowd.com/.

* cited by examiner

GROUP TAGGING OF DOCUMENTS

BACKGROUND

1. Field

The disclosure relates generally to document tagging and more specifically to modifying existing document tags created by an author of the document and adding new tags by one or more groups of document tag editors to provide different viewpoints regarding the subject matter, content, or topic of the document.

2. Description of the Related Art

Document tagging is the assignment by a person, such as an author or editor of a document, of one or more relevant keywords or descriptive words regarding the subject matter or content of the document, using terms that mean something to the person doing the tagging. When a person adds one or more tags to a document, the person is adding metadata to describe what the document subject matter contains or what the document is about. Tags improve a person's ability to find a document among a multitude of documents that may be similar, but different. In addition, tags are a way to keep documents organized into different groups of documents based on the keywords found in the document tags. A tag keyword is a natural language identifier of the subject matter, content, or topic of a document. A person may use a keyword search to retrieve one or more documents from an information system.

SUMMARY

According to one illustrative embodiment, a method for assigning a new set of tags to a document is provided. A computer receives a document with a set of existing tags created by an author of the document via a network. The computer receives a set of new tags created by a group of tag editors corresponding to the document via the network. The computer processes the set of existing tags created by the author of the document with the set of new tags created by the group of tag editors. The computer assigns a new set of tags to the document based on the processing of the set of existing tags created by the author of the document with the set of new tags created by the group of tag editors. According to other illustrative embodiments, a computer system and a computer program product for assigning a new set of tags to a document are provided.

DETAILED DESCRIPTION

Figure 1:
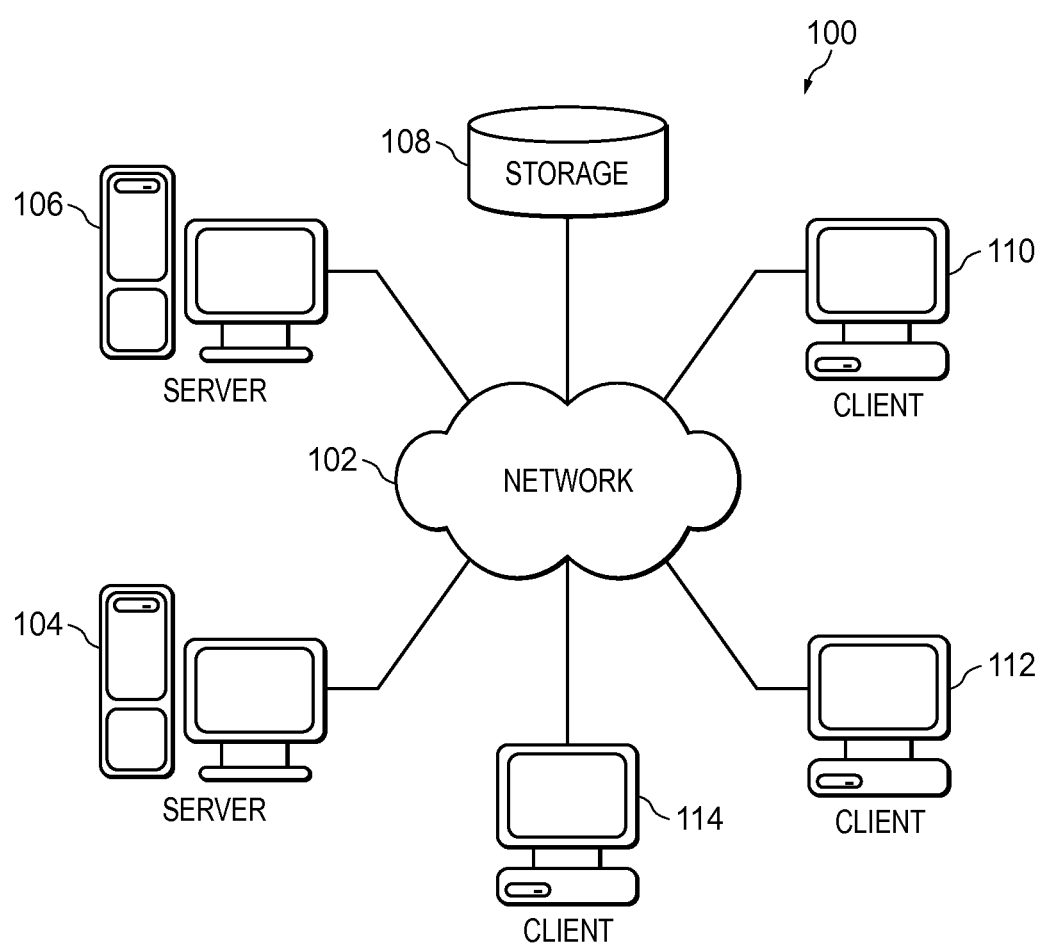
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
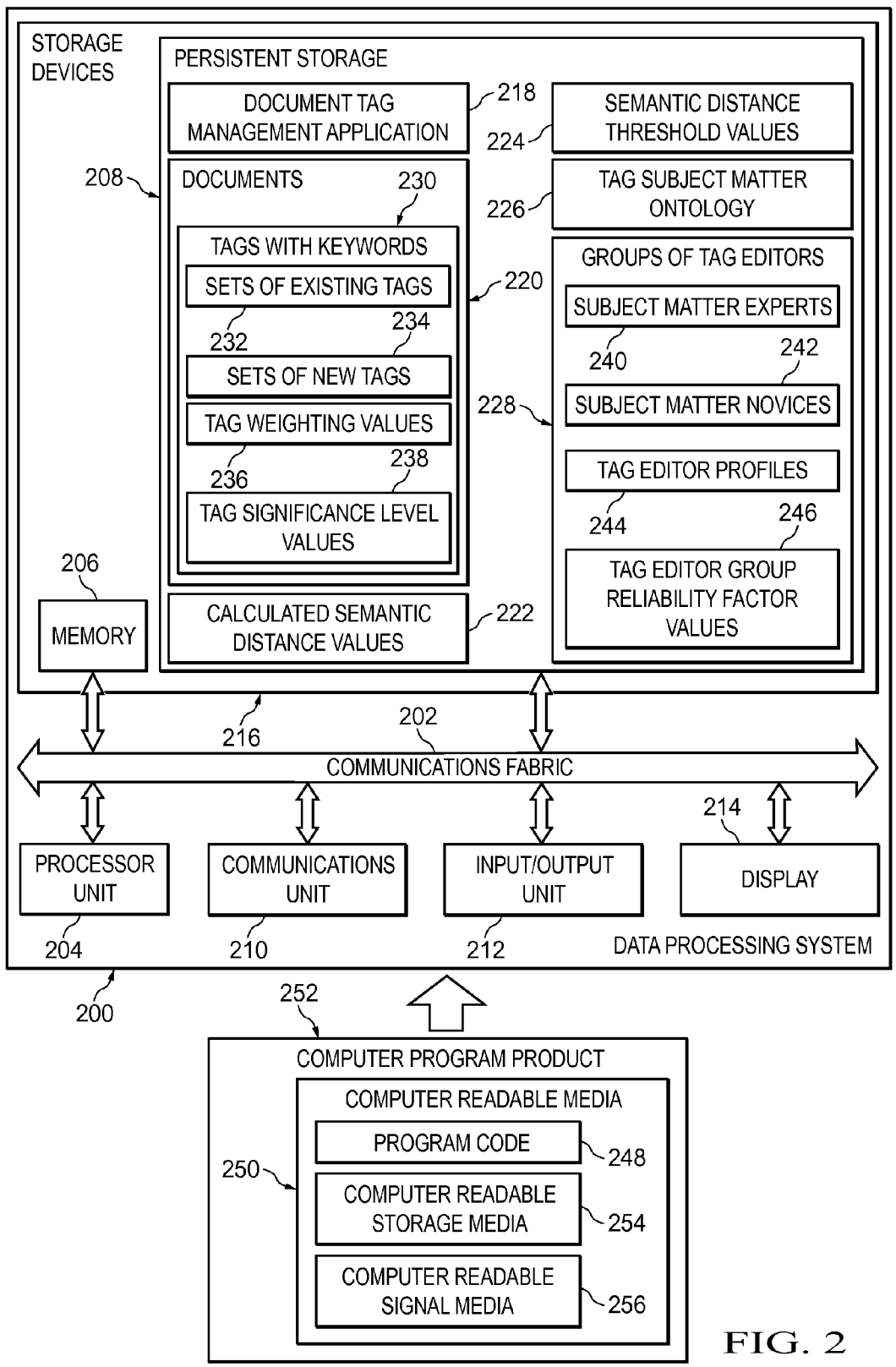
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more document tagging services to users of the client devices.

A document tagging service is a process that assigns a new set of tags to a document based on the processing of a set of existing tags created by an author of the document with a set of new tags created by a set of one or more independent groups of tag editors. A document may be, for example, a textual document, a file containing a plurality of textual documents, a spreadsheet, an audio file, a video file, a picture file, a Web page, a Web address, a uniform resource locator, and the like. A group of tag editors is two or more people, who do not include the author of the document, that modify existing tags created by the author of the document or create new tags corresponding to the document. Each of the tag editors in the group of tag editors may be located at different client devices in a same location or may be located at different client devices in different remote locations.

Client device 110, client device 112, and client device 114 also connect to network 102. Client devices 110, 112, and 114 are clients to server 104 or server 106. In the depicted example, server 104 or server 106 may provide information, such as boot files, operating system images, and applications to client devices 110, 112, and 114. Users of client devices 110, 112, and 114 may utilize client devices 110, 112, and 114 to access the document tagging services provided by server 104 or server 106.

In this example, client devices 110, 112, and 114 are personal desktop computers. However, it should be noted that client devices 110, 112, and 114 are intended as examples only. For example, client devices 110, 112, and 114 may be network computers, smart phones, cellular telephones, laptop computers, handheld computers, personal digital assistants, smart watches, or gaming devices with wireless or wire communication links to network 102. In addition, client devices 110, 112, and 114 may represent any combination of different data processing devices connected to network 102.

Storage 108 is a network storage device capable of storing data in a structured format or unstructured format. Storage 108 may provide storage of a plurality of different user names and associated identification numbers; user profiles; and user account information associated with the document tagging service. Storage 108 also may store document tag management applications and a plurality of different documents tagged with keywords. Further, storage unit 108 may store other data, such as authentication or credential data that may include user names, passwords, and biometric data associated with the plurality of users and system administrators. It should be noted that storage unit 108 may store any data that may be utilized by the document tagging service of illustrative embodiments.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program instructions may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program instructions or code implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores document tag management application 218, documents 220, calculated semantic distance values 222, semantic distance threshold values 224, tag subject matter ontology 226, and groups of tag editors 228. However, it should be noted that persistent storage 208 may store any type of application, program, module, and data utilized by the different illustrative embodiments.

Document tag management application 218 is a software program that assigns a new set of tags to a document based on processing a set of existing tags created by an author of the document with a set of new or modified tags created by a group of tag editors. Documents 220 are a plurality of different documents containing a plurality of different subject matters, contents, and topics. Documents 220 include tags with keywords 230. Tags with keywords 230 are a plurality of different document tags containing natural language keywords that describe or identify the subject matter, content, or topic of the different documents within documents 220. Tags with keywords 230 include sets of existing tags 232, sets of new tags 234, tag weighting values 236, and tag significance level values 238.

Sets of existing tags 232 are document tags that were previously created by the authors of documents 220. Sets of new tags 234 are document tags that were created by one or more groups of tag editors. Tag weighting values 236 are weights assigned to the different tags with keywords 230. Tag weighting values 236 may be assigned to sets of existing tags 232 by the authors of documents 220, for example. Tag weighting values 236 also may be assigned to sets of new tags 234 by the one or more groups of tag editors of documents 220. Further, document tag management application 218 may assign tag weighting values 236 to sets of new tags 234 based on calculated semantic distances between sets of existing tags 232 and sets of new tags 234. Furthermore, document tag management application 218 may assign tag weighting values 236 to sets of new tags 234 based on profiles of each of the tag editors within the one or more groups of tag editors of documents 220. A tag weighting value may be in a range from one (1) to ten (10), for example.

Tag significance level values 238 are different levels of significance associated with different document tags. Document tag management application 218 determines tag significance level values 238 based on calculated semantic distance values 222 between corresponding existing and new tags and their assigned tag weighting values 236. For example, document tag management application 218 may increase a significance level of a new tag when the calculated semantic distance between the new tag and a semantically corresponding existing tag is greater than a semantic distance threshold value. Similarly, document tag management application 218 may decrease a significance level of a new tag when the calculated semantic distance between the new tag and a semantically corresponding existing tag is less than the semantic distance threshold value. In addition, document tag management application 218 may ignore or merge new tags that are nearer in semantic distance to existing tags. Further, document tag management application 218 may base weighted averaging of the tag significance levels on the level of expertise of the group of tag editors providing the new tags. For example, document tag management application 218 may assign a higher weight to a tag provided by an expert tag editor. Similarly, document tag management application 218 may assign a lower weight to a tag provided by an anonymous tag editor.

Calculated semantic distance values 222 are semantic distances between new tags and corresponding existing tags of a document. Tag management application 218 calculates the semantic distance values. A semantic distance value may be in a range from zero (0) to one (1), for example. A semantic distance is a measure of the relationship between the meaning of keywords and phrases found in the different tags. In other words, document tag management application 218 calculates how similar or how dissimilar the meaning of a keyword or phrase found in a new tag is from a keyword or phrase found in corresponding existing tag of a document. For example, similar keyword tags will have a decreased or relatively small semantic distance value, whereas dissimilar keyword tags will have an increased or relatively large semantic distance value. In addition, similar keyword tags with a decreased semantic distance value will have a correspondingly decreased tag significance level value associated with the similar keyword tags. Similarly, dissimilar keyword tags with an increased semantic distance value will have a correspondingly increased tag significance level value associated with the dissimilar keyword tags.

Document tag management application 218 utilizes semantic distance threshold values 224 to determine the significance levels of the different document tags. For example, document tag management application 218 may assign a higher tag significance level value to a new tag above the defined semantic distance threshold value. Similarly, document tag management application 218 may assign a lower tag significance level value to a new tag below the defined semantic distance threshold value.

Tag subject matter ontology 226 represents a hierarchy of subject matters, concepts, topics, or contents within a domain, using a shared natural language vocabulary to denote types, properties, and interrelationships of the subject matters, concepts, topics, or contents. An ontology is a structural framework for organizing the information and is said to be at a semantic level, whereas a database schema is a model of data at a logical or physical level. Semantic means the relationship between words and phrases and what the words and phrases stand for.

Groups of tag editors 228 are a set of two or more different groups of document tag editors. Groups of tag editors 228 may modify existing keyword tags of a document created by an author of the document or may add new keyword tags to the document. Groups of tag editors 228 include subject matter experts 240, subject matter novices 242, tag editor profiles 244, and tag editor group reliability factor values 246.

Subject matter experts 240 are people who are an authority in a particular area of interest or on a particular topic. As a result, document tag management application 218 may assign a higher weight to new tags created by subject matter experts 240 within their own area of expertise. Subject matter novices 242 are people who only have little or general knowledge about an area of interest or on a particular topic. As a result, document tag management application 218 may assign a lower weight to new tags created by subject matter novices 242. Subject matter novices 242 also may include people who anonymously create tags for a document.

Tag editor profiles 244 are profiles for each of the different tag editors. A profile may, for example, show that a tag editor associated with that particular profile is an expert in a particular field of endeavor. The profile also may list the tag editor's place of employment, position in company, years of experience, age, gender, nationality, relationship status, skills, hobbies, likes, dislikes, interests, et cetera.

Tag editor group reliability factor values 246 are values that document tag management application 218 assigns to each different tag editor group. For example, document tag management application 218 may assign a higher reliability factor value to a tag editor group consisting mostly of subject matter experts, which document tag management application 218 may determine using tag editor profiles 244.

Similarly, document tag management application 218 may assign a lower reliability factor value to a tag editor group consisting mostly of subject matter novices, general knowledge editors, or anonymous editors. A reliability factor value may be in a range from one tenth (0.1) to one (1), for example.

Communications unit 210, in this example, provides for communication with other data processing systems, such as server device 106, storage device 108, and client devices 110, 112, and 114 in FIG. 1. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator or a document tag reviewer/editor.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more other devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that documents are often tagged by the authors of the documents. Tagging the documents is based on certain keywords of the documents, as well as the interpretation of the subject matter, content, concept, or topic of a document by an author. However, the same document may have a different meaning, connotation, or significance to different readers. As a result, that same document may not be in the hit list for all the different readers if the document doesn't have the appropriate tags associated with it. Consequently, document tags are best assigned by different readers based on their own perspectives. Thus, illustrative embodiments provide a collective group effort to modifying or adding tags corresponding to a document.

Illustrative embodiments provide a way of tagging documents based on group or crowd support. Illustrative embodiments submit a document for a collective group effort in identifying relevant tags for a document. Illustrative embodiments rate and rank the group-suggested tags using a tag weighting process based on a reliability factor value assigned to the particular group of tag editors that suggested the new tags for the document. The reliability factor value is dependent on the type of tag editor group that is providing the tag modifications or additions to a document. For example, a preferred group or subject matter expert group of tag editors modifying or adding tags will have a higher reliability factor score than an anonymous tag editor group or general knowledge tag editor group.

Illustrative embodiments also organize document tags based on a tag subject matter ontology, which is different than organizing tags by frequency of use or by alphabetical order. An ontology refers to the "conceptual description" of the subject matter, content, or topic of a document and its relationships to other 'things" or "concepts" and its hierarchical classification or taxonomy. For example, "UT Austin" has a taxonomy like "University", "Educational Institution", "State Institute", "Public Institute", et cetera and its related concepts are "Courses", "Degrees", "Professors", "Researchers", "Departments", et cetera. Here when an editor provides a tag, illustrative embodiments examine the tag's ontology semantically to identify similarity of subject matter to determine a corresponding existing tag keyword string corresponding to the document. Also, a search engine or process may use this tag semantic information to find matches rather than using syntactical alphanumeric strings.

Further, illustrative embodiments may suppress or ignore duplicate or near duplicate tags corresponding to the same document. Alternatively, illustrative embodiments may merge or combine duplicate tags or near duplicate tags with similar semantic meaning. Illustrative embodiments identify the duplicate or near duplicate tags based on the ontology through abstraction of the original tag keyword string.

Specific document publishers may assemble different groups of document tag editors for tagging of documents. Alternatively, illustrative embodiments may assemble different groups of document tag editors based on information within profiles provided by the different tag editors. The document publishers may utilize the tag management service of illustrative embodiments to send new documents that need tagging or existing documents that need tag review and modification to the different groups of tag editors based on document subject matter or content. For every document that illustrative embodiments present for group tagging, the tag management application of illustrative embodiments will show to the group of tag editors the currently existing tags created by the author of a document and each tag's individual ratings provided by the author. The group of tag editors may add new tags with their own "significance level" attached to each new tag or may modify existing tags and the author-provided "significance level" associated with each existing tag.

Afterward, illustrative embodiments rerun the tag management application to rate and rank the document tags based on the processing of the new tags created by the group of tag editors with the existing tags created by the document author. In addition, illustrative embodiments filter the tags based on finding duplicate or near duplicate keywords or phrases in tags corresponding to a document. Illustrative embodiments also use natural language semantics to aggregate and organize document tags taxonomically. Further, illustrative embodiments rate and rank the document tags by adding a weighted value to each tag. A simple ranking approach may be using a weighted average of various "significance levels" assigned to each of the different tags. More sophisticated ranking approaches may be based on the types of tag editors (e.g., subject matter experts, general knowledge tag editors, anonymous tag editors, et cetera) being used to provide the new or modified tags.

The tag significance level may come from multiple sources. For example, each tag editor in a group of tag editors may provide a tag weighting for each tag a particular tag editor provides. As another example, illustrative embodiments may infer the tag significance level based on the semantic distance between a set of existing tags corresponding to a document created by the author of the document and a set of new tags corresponding to the document created by the group of tag editors. The significance level of a document tag is the inverse of the "statistical significance" of the document tag. For example, the statistical significance of a tag increases as the number of occurrences of that same tag increases. However, illustrative embodiments utilize a semantic approach, which increases a significance level value of a new tag when the new tag has an increased semantic distance from a corresponding existing tag, while illustrative embodiments ignore or merge new tags that are nearer in semantic distance to existing tags. In other words, an "outlying" new tag with a relatively large semantic distance value is of more significance than a "commonly occurring" new tag with a relatively small semantic distance value. The weighted averaging of the tag significance level may be based on the level of expertise of the group of tag editors. For example, a higher weight may be given to an expert tag editor or preferred tag editor and a lower weight may be given to a general knowledge tag editor, novice tag editor, or anonymous tag editor.

Illustrative embodiments also may "pin" or attach certain tags to a document. In other words, the pinned tags are always present with the document. Further, illustrative embodiments may use new tags based on individual new tags having a "weighted average of significance level value" above a defined threshold level.

Figure 3:
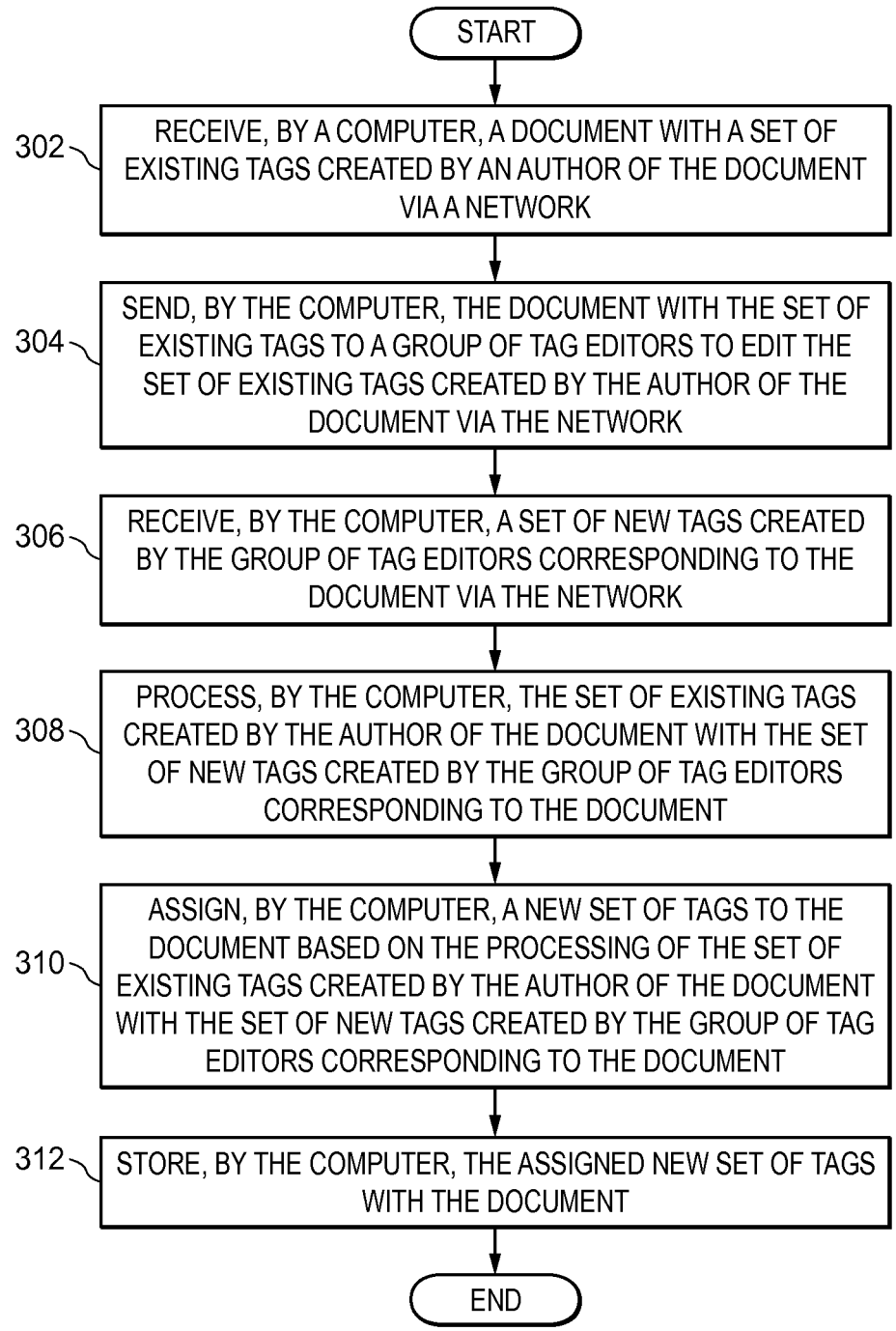
FIG. 3 is a flowchart illustrating a process for assigning a new set of tags to a document in accordance with an illustrative embodiment.

With reference now to FIG. 3, a flowchart illustrating a process for assigning a new set of tags to a document is shown in accordance with an illustrative embodiment. The process shown in FIG. 3 may be implemented in a computer, such as, for example, server 104 in FIG. 1 and data processing system 200 in FIG. 2.

The process begins when the computer receives a document with a set of existing tags created by an author of the document via a network (step 302). The document may be, for example, a document within documents 220 and the set of existing tags may be, for example, a set of existing tags within sets of existing tags 232 in FIG. 2. The network may be, for example, network 102 in FIG. 1.

After receiving the document with the set of existing tags in step 302, the computer sends the document with the set of existing tags to a group of tag editors to edit the set of existing tags created by the author of the document via the network (step 304). The group of tag editors may be, for example, a group of tag editors within groups of tag editors 228 in FIG. 2. Subsequently, the computer receives a set of new tags created by the group of tag editors corresponding to the document via the network (step 306). The set of new tags may be, for example, a set of new tags within sets of new tags 234 in FIG. 2.

The computer then processes the set of existing tags created by the author of the document with the set of new tags created by the group of tag editors corresponding to the document (step 308). Afterward, the computer assigns a new set of tags to the document based on the processing of the set of existing tags created by the author of the document with the set of new tags created by the group of tag editors corresponding to the document (step 310). In addition, the computer stores the assigned new set of tags with the document (step 312). Thereafter, the process terminates.

Figure 4:
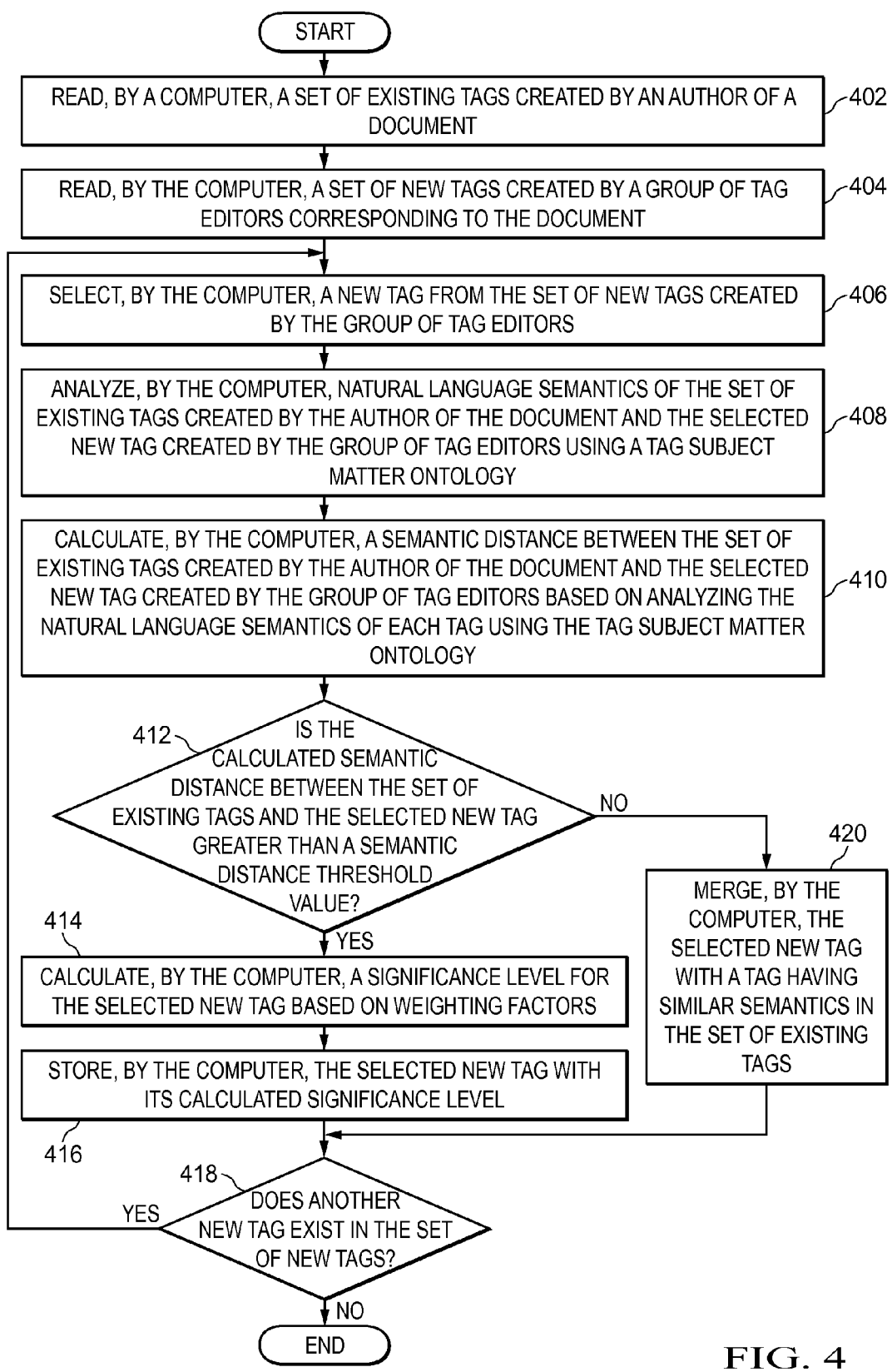
FIG. 4 is a flowchart illustrating a process for processing different sets of tags corresponding to a document in accordance with an illustrative embodiment.

With reference now to FIG. 4, a flowchart illustrating a process for processing different sets of tags corresponding to a document is shown in accordance with an illustrative embodiment. The process shown in FIG. 4 may be implemented in a computer, such as, for example, server 104 in FIG. 1 and data processing system 200 in FIG. 2. In addition, the process shown in FIG. 4 may be implemented in step 308 of FIG. 3.

The process begins when the computer reads a set of existing tags created by an author of a document (step 402). The document may be, for example, a document within documents 220 and the set of existing tags may be, for example, a set of existing tags within sets of existing tags 232 in FIG. 2. The computer also reads a set of new tags created by a group of tag editors corresponding to the document (step 404). The set of new tags may be, for example, a set of new tags within sets of new tags 234 and the group of tag editors may be, for example, a group of tag editors within groups of tag editors 228 in FIG. 2.

In addition, the computer selects a new tag from the set of new tags created by the group of tag editors (step 406). Further, the computer analyzes natural language semantics of the set of existing tags created by the author of the document and the selected new tag created by the group of tag editors using a tag subject matter ontology (step 408). The tag subject matter ontology may be, for example, tag subject matter ontology 226 in FIG. 2.

Afterward, the computer calculates a semantic distance between the set of existing tags created by the author of the document and the selected new tag created by the group of tag editors based on analyzing the natural language semantics of each tag using the tag subject matter ontology (step 410). The calculated semantic distance may be, for example, a calculated semantic distance value within calculated semantic distance values 222 in FIG. 2. Subsequently, the computer makes a determination as to whether the calculated semantic distance between the set of existing tags and the selected new tag is greater than a semantic distance threshold value (step 412). The semantic distance threshold value may be, for example, a semantic distance threshold value within semantic distance threshold values 224 in FIG. 2.

If the computer determines that the calculated semantic distance between the set of existing tags and the selected new tag is greater than the semantic distance threshold value, yes output of step 412, then the computer calculates a significance level for the selected new tag based on weighting factors (step 414). The significance level may be, for example, a tag significance level value within tag significance level values 238 in FIG. 2. The weighting factors may be, for example, a reliability factor value corresponding to the group of tag editors adjusted by a value determined by a document tag management application, such as document tag management application 218 in FIG. 2, and the calculated semantic distance value adjusted by a tag weighting value given by the group of tag editors to the selected new tag. The reliability factor may be, for example, a tag editor group reliability factor value within tag editor group reliability factor values 246 in FIG. 2. The computer may, for example, utilize the following equation to calculate the significance level for the selected new tag based on the weighting factors:

$$Tag_{SL}=(SM*a)+(weight*b)$$

where the tag significance level value for the new tag ($Tag_{SL}$) is equal to the calculated semantic distance (SM) multiplied by the application-defined adjustment value (a) added to the tag weighting value given by the group of tag editors to the selected new tag (weight) multiplied by the reliability factor value corresponding to the group of tag editors (b).

Afterward, the computer stores the selected new tag with its calculated significance level (step 416). The computer may store the selected new tag with its calculated significance level in a storage device, such as, for example, persistent storage 208 in FIG. 2. Subsequently, the computer makes a determination as to whether another new tag exists in the set of new tags (step 418). If the computer determines that another new tag does exist in the set of new tags, yes output of step 418, then the process returns to step 406 where the computer selects another new tag from the set of new tags. If the computer determines that another new tag does not exist in the set of new tags, no output of step 418, then the process terminates thereafter.

Returning again to step 412, if the computer determines that the calculated semantic distance between the set of existing tags and the selected new tag is not greater than the semantic distance threshold value, no output of step 412, then the computer merges the selected new tag with a tag having similar semantics in the set of existing tags (step 420). Alternatively, the computer may filter, suppress, delete, or ignore the selected new tag having the corresponding calculated semantic distance less than the semantic distance threshold value. Thereafter, the process returns to step 418 where the computer determines whether another new tag exists in the set of new tags.

Figure 5:
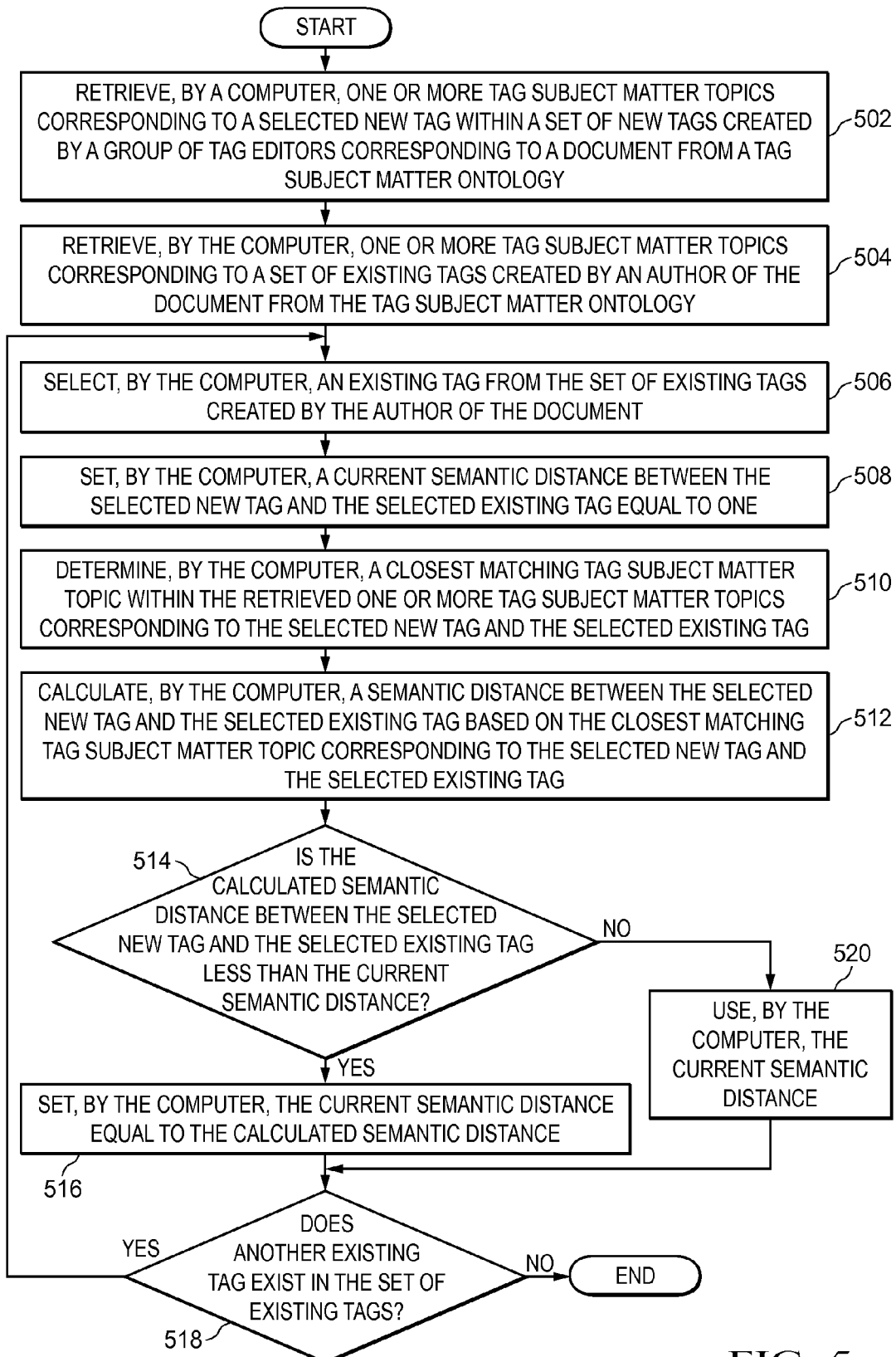
FIG. 5 is a flowchart illustrating a process for calculating a semantic distance between new and existing tags corresponding to a document in accordance with an illustrative embodiment.

With reference now to FIG. 5, a flowchart illustrating a process for calculating a semantic distance between new and existing tags corresponding to a document is shown in accordance with an illustrative embodiment. The process shown in FIG. 5 may be implemented in a computer, such as, for example, server 104 in FIG. 1 and data processing system 200 in FIG. 2. In addition, the process shown in FIG. 5 may be implemented in step 410 of FIG. 4.

The process begins when the computer retrieves one or more tag subject matter topics corresponding to a selected new tag within a set of new tags created by a group of tag editors corresponding to a document from a tag subject matter ontology (step 502). The selected new tag within the set of new tags may be, for example, a selected new tag within sets of new tags 234 in FIG. 2. The group of tag editors may be, for example, a group of tag editors in groups of tag editors 228 in FIG. 2. The document may be, for example, a document within documents 220 in FIG. 2. The tag subject matter ontology may be, for example, tag subject matter ontology 226 in FIG. 2.

In addition, the computer retrieves one or more tag subject matter topics corresponding to a set of existing tags created by an author of the document from the tag subject matter ontology (step 504). The set of existing tags may be, for example, a set of existing tags within sets of existing tags 232 in FIG. 2. Then, the computer selects an existing tag from the set of existing tags created by the author of the document (step 506). The computer also sets a current semantic distance between the selected new tag and the selected existing tag equal to one (1) (step 508). Further, the computer determines a closest matching tag subject matter topic within the retrieved one or more tag subject matter topics corresponding to the selected new tag and the selected existing tag (step 510).

Afterward, the computer calculates a semantic distance between the selected new tag and the selected existing tag based on the closest matching tag subject matter topic corresponding to the selected new tag and the selected existing tag (step 512). The calculated semantic distance may be, for example, a calculated semantic distance value in calculated semantic distance values 222 in FIG. 2. Subsequently, the computer makes a determination as to whether the calculated semantic distance between the selected new tag and the selected existing tag is less than the current semantic distance (i.e., 1) (step 514).

If the computer determines that the calculated semantic distance between the selected new tag and the selected existing tag is less than the current semantic distance, yes output of step 514, then the computer sets the current semantic distance equal to the calculated semantic distance (step 516). Afterward, the computer makes a determination as to whether another existing tag exists in the set of existing tags (step 518). If the computer determines that another existing tag does exist in the set of existing tags, yes output of step 518, then the process returns to step 506 where the computer selects another existing tag from the set of existing tags. If the computer determines that another existing tag does not exist in the set of existing tags, no output of step 518, then the process terminates thereafter.

Returning again to step 514, if the computer determines that the calculated semantic distance between the selected new tag and the selected existing tag is not less than the current semantic distance (i.e., 1), no output of step 514, then the computer uses the current semantic distance (step 520). Thereafter, the process returns to step 518 where the computer determines whether another existing tag exists in the set of existing tags.

Thus, illustrative embodiments provide a method, computer system, and computer program product for assigning a new set of tags to a document based on the processing of a set of existing tags created by an author of the document with a set of new tags created by a group of tag editors. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for assigning a new set of tags to a document, the method comprising:
    receiving, by a computer executing a document tag management application stored in a persistent storage of the computer, the document with a set of existing tags created by an author of the document via a network;
    receiving, by the computer using the document tag management application, a set of new tags created by a group of tag editors corresponding to the document via the network;
    processing, by the computer using the document tag management application, the set of existing tags created by the author of the document with the set of new tags created by the group of tag editors by:
        selecting, by the computer using the document tag management application, a new tag from the set of new tags created by the group of tag editors;
        analyzing, by the computer using the document tag management application, natural language semantics of the set of existing tags created by the author of the document and the selected new tag created by the group of tag editors using a tag subject matter ontology;
        calculating, by the computer using the document tag management application, a semantic distance between the set of existing tags created by the author of the document and the selected new tag created by the group of tag editors based on the analyzing of the natural language semantics of each tag using the tag subject matter ontology;
        determining, by the computer using the document tag management application, whether the calculated semantic distance between the set of existing tags and the selected new tag is greater than a semantic distance threshold value; and
        responsive to the computer determining that the calculated semantic distance between the set of existing tags and the selected new tag is greater than the semantic distance threshold value, calculating, by the computer using the document tag management application, a significance level for the selected new tag based on weighting factors, wherein the significance level for the selected new tag is equal to the calculated semantic distance multiplied by an application-defined adjustment value added to a tag weighting value given by the group of tag editors to the selected new tag multiplied by a reliability factor value corresponding to the group of tag editors; and
    assigning, by the computer using the document tag management application, the new set of tags to the document based on the processing of the set of existing tags created by the author of the document with the set of new tags created by the group of tag editors, wherein the computer using the document tag management application stores the new set of tags with the document.

2. The method of claim 1, further comprising:
    responsive to the computer determining that the calculated semantic distance between the set of existing tags and the selected new tag is not greater than the semantic distance threshold value, merging, by the computer using the document tag management application, the selected new tag with a tag having similar semantics in the set of existing tags.

3. The method of claim 1, further comprising:
    retrieving, by the computer using the document tag management application, one or more tag subject matter topics corresponding to a selected new tag within the set of new tags created by the group of tag editors from a tag subject matter ontology; and
    retrieving, by the computer using the document tag management application, one or more tag subject matter topics corresponding to the set of existing tags created by the author of the document from the tag subject matter ontology.

4. The method of claim 3, further comprising:
    selecting, by the computer using the document tag management application, an existing tag from the set of existing tags created by the author of the document;
    setting, by the computer using the document tag management application, a current semantic distance between the selected new tag and the selected existing tag equal to one; and
    determining, by the computer using the document tag management application, a closest matching tag subject matter topic within the retrieved one or more tag subject matter topics corresponding to the selected new tag and the selected existing tag.

5. The method of claim 4, further comprising:
    calculating, by the computer using the document tag management application, a semantic distance between the selected new tag and the selected existing tag based on the closest matching tag subject matter topic corresponding to the selected new tag and the selected existing tag.

6. The method of claim 5, further comprising:
    determining, by the computer using the document tag management application, whether the calculated semantic distance between the selected new tag and the selected existing tag is less than the current semantic distance; and
    responsive to the computer determining that the calculated semantic distance between the selected new tag and the selected existing tag is less than the current semantic distance, setting, by the computer using the document tag management application, the current semantic distance equal to the calculated semantic distance.

7. The method of claim 6, further comprising:
    responsive to the computer determining that the calculated semantic distance between the selected new tag and the selected existing tag is greater than or equal to the current semantic distance, using, by the computer using the document tag management application, the current semantic distance.

8. A computer system for assigning a new set of tags to a document, the computer system comprising:
    a bus system;

a storage device connected to the bus system, wherein the storage device stores program instructions of a document tag management application; and a processor connected to the bus system, wherein the processor executes the program instructions of the document tag management application to:

receive the document with a set of existing tags created by an author of the document via a network; receive a set of new tags created by a group of tag editors corresponding to the document via the network;

process the set of existing tags created by the author of the document with the set of new tags created by the group of tag editors by:

selecting a new tag from the set of new tags created by the group of tag editors;

analyzing natural language semantics of the set of existing tags created by the author of the document and the selected new tag created by the group of tag editors using a tag subject matter ontology;

calculating a semantic distance between the set of existing tags created by the author of the document and the selected new tag created by the group of tag editors based on the analyzing of the natural language semantics of each tag using the tag subject matter ontology;

determining whether the calculated semantic distance between the set of existing tags and the selected new tag is greater than a semantic distance threshold value; and calculating a significance level for the selected new tag based on weighting factors in response to determining that the calculated semantic distance between the set of existing tags and the selected new tag is greater than the semantic distance threshold value, wherein the significance level for the selected new tag is equal to the calculated semantic distance multiplied by an application-defined adjustment value added to a tag weighting value given by the group of tag editors to the selected new tag multiplied by a reliability factor value corresponding to the group of tag editors; and assign the new set of tags to the document based on the processing of the set of existing tags created by the author of the document with the set of new tags created by the group of tag editors, wherein the computer executing the document tag management application stores the new set of tags with the document.

9. The computer system of claim 8, wherein the processor further executes the program instructions of the document tag management application to merge the selected new tag with a tag having similar semantics in the set of existing tags in response to determining that the calculated semantic distance between the set of existing tags and the selected new tag is not greater than the semantic distance threshold value.

10. A computer program product for assigning a new set of tags to a document, the computer program product comprising a computer readable storage medium having program instructions of a document tag management application embodied therewith, the program instructions of the document tag management application executable by a computer to cause the computer to perform a method comprising:

receiving, by the computer using the document tag management application, the document with a set of existing tags created by an author of the document via a network;

receiving, by the computer using the document tag management application, a set of new tags created by a group of tag editors corresponding to the document via the network;

processing, by the computer using the document tag management application, the set of existing tags created by the author of the document with the set of new tags created by the group of tag editors by:

selecting, by the computer using the document tag management application, a new tag from the set of new tags created by the group of tag editors;

analyzing, by the computer using the document tag management application, natural language semantics of the set of existing tags created by the author of the document and the selected new tag created by the group of tag editors using a tag subject matter ontology;

calculating, by the computer using the document tag management application, a semantic distance between the set of existing tags created by the author of the document and the selected new tag created by the group of tag editors based on the analyzing of the natural language semantics of each tag using the tag subject matter ontology;

determining, by the computer using the document tag management application, whether the calculated semantic distance between the set of existing tags and the selected new tag is greater than a semantic distance threshold value; and responsive to the computer determining that the calculated semantic distance between the set of existing tags and the selected new tag is greater than the semantic distance threshold value, calculating, by the computer using the document tag management application, a significance level for the selected new tag based on weighting factors, wherein the significance level for the selected new tag is equal to the calculated semantic distance multiplied by an application-defined adjustment value added to a tag weighting value given by the group of tag editors to the selected new tag multiplied by a reliability factor value corresponding to the group of tag editors; and assigning, by the computer, the new set of tags to the document based on the processing of the set of existing tags created by the author of the document with the set of new tags created by the group of tag editors wherein the computer using the document tag management application stores the new set of tags with the document.

11. The computer program product of claim 10, further comprising:

responsive to the computer determining that the calculated semantic distance between the set of existing tags and the selected new tag is not greater than the semantic distance threshold value, merging, by the computer using the document tag management application, the selected new tag with a tag having similar semantics in the set of existing tags.

* * * * *